US010417955B2

(12) United States Patent
Chang

(10) Patent No.: US 10,417,955 B2
(45) Date of Patent: Sep. 17, 2019

(54) IMAGE PROCESSING METHOD AND DEVICE FOR LED DISPLAY SCREEN

(71) Applicant: LEYARD OPTOELECTRONIC CO., LTD., Beijing (CN)

(72) Inventor: Ming Chang, Beijing (CN)

(73) Assignee: Leyard Optoelectronic Co., Ltd., Beijing (CN)

( * ) Notice: Subject to any disclaimer, the term of this patent is extended or adjusted under 35 U.S.C. 154(b) by 0 days.

(21) Appl. No.: 15/766,961

(22) PCT Filed: Nov. 17, 2015

(86) PCT No.: PCT/CN2015/094836
§ 371 (c)(1),
(2) Date: Apr. 9, 2018

(87) PCT Pub. No.: WO2017/059620
PCT Pub. Date: Apr. 13, 2017

(65) Prior Publication Data
US 2019/0066572 A1 Feb. 28, 2019

(30) Foreign Application Priority Data

Oct. 9, 2015 (CN) .......................... 2015 1 0649260

(51) Int. Cl.
*G09G 3/32* (2016.01)
*G06F 3/14* (2006.01)
(Continued)

(52) U.S. Cl.
CPC ................ *G09G 3/32* (2013.01); *G06F 3/14* (2013.01); *G09G 3/2003* (2013.01);
(Continued)

(58) Field of Classification Search
None
See application file for complete search history.

(56) References Cited

U.S. PATENT DOCUMENTS 6,320,680 B1 * 11/2001 Rhoads .................... H04N 1/04
358/444
8,594,465 B2 * 11/2013 Karlov .................. G06T 3/4007
382/162
(Continued)

FOREIGN PATENT DOCUMENTS

| CN | 101673510 A | 3/2010 |
|---|---|---|
| CN | 103278954 A | 9/2013 |
| CN | 103985320 A | 8/2014 |

OTHER PUBLICATIONS

International Search Report for International Application No. PCT/CN2015/094836, dated Jun. 28, 2016, 2 pages.

*Primary Examiner* — Frank S Chen
(74) *Attorney, Agent, or Firm* — Armstrong Teasdale LLP

(57) ABSTRACT

Provided herein is an image processing method and device for a Light Emitting Diode (LED) display screen. The image processing method for an LED display screen includes: receiving original image data; acquiring information of an original pixel according to the original image data; executing the information of the original pixel computation according to a preset algorithm to obtain information of target pixels; and controlling an image corresponding to the original image data according to the color information of the target pixel and the position information of the target pixel to be displayed on the LED display screen panel. The disclosure improves the quality of a displayed image of an LED display screen.

15 Claims, 8 Drawing Sheets

(51) Int. Cl.
*G09G 3/20* (2006.01)
*G09G 5/00* (2006.01)

(52) U.S. Cl.
CPC ........... *G09G 3/2051* (2013.01); *G09G 5/005* (2013.01); *G09G 2300/0452* (2013.01); *G09G 2320/02* (2013.01); *G09G 2340/0407* (2013.01)

(56) References Cited

U.S. PATENT DOCUMENTS

| | | | |
|---|---|---|---|
| 2013/0135299 A1 | 5/2013 | Park et al. | |
| 2014/0321764 A1* | 10/2014 | Zarom | H04N 19/593 |
| | | | 382/243 |
| 2017/0339381 A1* | 11/2017 | Kojima | G06T 5/003 |

* cited by examiner

IMAGE PROCESSING METHOD AND DEVICE FOR LED DISPLAY SCREEN

CROSS-REFERENCE TO RELATED APPLICATIONS

This application is the national stage entry of PCT/CN2015/094836, filed on Nov. 17, 2015, which claims the benefit of priority to Chinese Patent Application No. 201510649260.6, filed Oct. 9, 2015, which is incorporated by reference in its entirety herein.

TECHNICAL FIELD

The disclosure relates to the field of image processing, and more particularly to an image processing method and device for a Light Emitting Diode (LED) display screen.

BACKGROUND

At present, an LED pixel point on an LED display screen is a pixel point distributed according to a certain preset rule, for example, a pixel point distributed according to a matrix form. FIG. 1 is a schematic diagram of an image display device for an LED display screen in a related art. As shown in FIG. 1, the image display device for an LED display screen includes an LED display screen panel 101', LED lamps 102', an optical lens 103', a photosensitive device 104' and photosensitive pixels particles 105'. After passing through the optical lens 103' on modern digital photographic equipment, light signals are converged onto the photosensitive device 104' on the modern digital photographic equipment, the photosensitive device 104' performs photoelectric conversion on the collected light signals via the photosensitive pixels particles 105' to obtain an electric signal. An LED controller controls a digital image, the electric signal capable of being received by the LED display screen is output, and the LED display screen further displays a digital image corresponding to the electric signal. The photosensitive device 104' may be a Charge Coupled Device (CCD) or a Complementary Metal Oxide Semiconductor (CMOS), and so on. The photosensitive pixels particles 105' are photosensitive pixels particles on the photosensitive device 104', which are distributed in a matrix form. The LED display screen includes an LED display screen panel 101' and LED lamps 102', the LED lamps 102' are distributed on the LED display screen panel 101' in a matrix form and characterized by being horizontal and vertical, and pixel information of the LED lamps may be represented.

The distribution manner for the LED lamps 102' on the LED display screen panel 101' and the distribution manner for the photosensitive pixels particles 105' on the photosensitive device 104' are the same as a matrix distribution manner. That is, the distribution manner for the LED pixel points on the LED display screen panel 101' is the same as the distribution manner for the photosensitive pixels particles 105' on the photosensitive device 104'. So, a digital image generated due to photoelectric diffraction suffers from a phenomenon of Moire patterns, which cannot be avoided. FIG. 2 is a schematic diagram of an LED display screen shot by a digital camera in the related art. As shown in FIG. 2, regular stripes are presented on the LED display screen shot by the digital camera due to Moire patterns. FIG. 3 is a schematic diagram of a displayed image of an LED display screen in the related art. As shown in FIG. 3, after a camera shoots clothes to obtain a clothes image, the clothes image is displayed via the LED display screen, textures in a regular array are displayed on the LED display screen, the quality of a picture is influenced, and a true effect of people's clothes cannot be presented. Moire patterns are generated on an image due to a photoelectric diffraction phenomenon, so the displayed image of the LED display screen is distorted and unclear, and the quality of the displayed image is seriously influenced, thus resulting in poor quality of an LED displayed image. Even if a device such as a glass and a film is added to the front of the LED display screen for compensation, the resulting problems of unsmooth heat dissipation, maintenance, development color shift, inconsistent image emergent light and the like cannot be solved.

Any effective solution has not been proposed yet currently for the problem of poor quality of a displayed image of an LED display screen resulting from generation of Moire patterns in the related art.

BRIEF DESCRIPTION

The disclosure mainly aims to provide an image processing method and device for an LED display screen, intended to solve the problem of poor quality of a displayed image of an LED display screen resulting from generation of Moire patterns.

To this end, according to an aspect of the disclosure, an image processing method for an LED display screen is provided. The image processing method for an LED display screen includes: receiving original image data; acquiring information of an original pixel according to the original image data, wherein the original pixel is a pixel point distributed on an LED display screen panel according to a preset rule, and the information of the original pixel includes color information of the original pixel and position information of the original pixel; executing computation on the information of the original pixel according to a preset algorithm to obtain information of a target pixel, wherein the target pixel is a pixel that is distributed not conforming to the preset rule, and the information of the target pixel comprises color information of the target pixel and position information of the target pixel; and controlling, according to the color information of the target pixel and the position information of the target pixel, an image corresponding to the original image data to be displayed on the LED display screen panel.

According to an aspect of the disclosure, after the information of the original pixel is acquired according to the original image data, the image processing method for an LED display screen further includes: extracting the color information of the original pixel; extracting pixel pitch information of the original pixel, wherein the pixel pitch information is information for representing a pitch between adjacent original pixel; and determining an offset needed for moving the original pixel to the target pixel, wherein executing the computation on the information of the original pixel according to the preset algorithm includes: executing the computation on the color information of the original pixel, the pixel pitch information of the original pixel and the offset by means of the preset algorithm to obtain color information of the target pixel.

According to an aspect of the disclosure, after the information of the original pixel is acquired according to the original image data, the image processing method for an LED display screen further includes: extracting coordination information of the original pixel; executing the computation on the information of the original pixel according to the preset algorithm comprises: offsetting the coordination information of the original pixel according to the offset to obtain coordination information of the target pixel; and controlling, according to the color information of the target pixel and the position information of the target pixel, the image corresponding to the original image data to be displayed on the LED display screen panel comprises: controlling a position of an LED pixel point on the LED display screen panel according to the coordination information of the target pixel, and displaying the image on the LED display screen panel according to the position of the LED pixel point and the color information of the target pixel.

According to an aspect of the disclosure, the offset includes a horizontal coordinate offset and a vertical coordinate offset, wherein the horizontal coordinate offset and the vertical coordinate offset are less than or equal to a preset threshold, and the preset threshold is less than a pixel pitch of the original pixel.

According to an aspect of the disclosure, the number of the original pixel is multiple, and determining the offset needed for moving the original pixel to the target pixel comprises: respectively determining offsets needed for moving the multiple original pixels to target pixels corresponding to the multiple original pixels to obtain multiple offsets, wherein the multiple offsets are different in magnitude or direction.

To this end, according to another aspect of the disclosure, an image processing device for an LED display screen is also provided. The image processing device for an LED display screen includes: a receiving element, configured to receive original image data; a receiving element, configured to receive original image data; an acquiring element, configured to acquire information of an original pixel according to the original image data, wherein the original pixel is a pixel point distributed on an LED display screen panel according to a preset rule, and the information of the original pixel comprises color information of the original pixel and position information of the original pixel; a computing element, configured to execute computation on the information of the original pixel according to a preset algorithm to obtain information of a target pixel, wherein the target pixel is a pixel that is distributed not conforming to the preset rule, and the information of the target pixel comprises color information of the target pixel and position information of the target pixel; and a controlling element, configured to control, according to the color information of the target pixel and the position information of the target pixel, an image corresponding to the original image data to be displayed on the LED display screen panel.

According to an aspect of the disclosure, the image processing device for an LED display screen further includes: an extracting element, configured to extract, after the information of the original pixel is acquired according to the original image data, the color information of the original pixel, and extract pixel pitch information of the original pixel, wherein the pixel pitch information is information for representing a pitch between adjacent original pixels; and a determining element, configured to determine an offset needed for moving the original pixel to the target pixel, wherein the computing element is configured to execute the computation on the color information of the original pixel, the pixel pitch information of the original pixel and the offset by means of a preset algorithm to obtain color information of the target pixel.

According to an aspect of the disclosure, the extracting element is further configured to extract, after the information of the original pixel is acquired according to the original image data, coordinate information of the original pixel, the computing element is further configured to offset the coordinate information of the original pixel according to the offset to obtain coordinate information of the target pixel, and the controlling element is configured to control a position of an LED pixel point on the LED display screen panel according to the coordination information of the target pixel, and to display the image on the LED display screen panel according to the position of the LED pixel point and the color information of the target pixel.

According to an aspect of the disclosure, the number of the original pixel is multiple, and the determining element is further configured to respectively determine offsets needed for moving the multiple original pixels to target pixels corresponding to the multiple original pixels to obtain multiple offsets, wherein the multiple offsets are different in magnitude or direction.

To this end, according to a further aspect of the disclosure, an image processing device for an LED display screen is also provided. The image processing device for an LED display screen includes: a processor, configured to receive original image data, acquire information of an original pixel according to the original image data, and execute computation on the information of the original pixel according to a preset algorithm to obtain information of a target pixel, wherein the original pixel is a pixel point distributed on an LED display screen panel according to a preset rule, the information of the original pixel comprises color information of the original pixel and position information of the original pixel, the target pixel is a pixel that is distributed not conforming to the preset rule, and the information of the target pixel comprises color information of the target pixel and position information of the target pixel; and an LED controller, configured to control, according to the information of the target pixel, an image corresponding to the original image data to be displayed on the LED display screen panel.

To this end, according to a yet further aspect of the disclosure, an LED display is also provided. The LED display includes any one of image processing devices for the LED display screen provided in the disclosure.

According to the disclosure, original image data is received, information of an original pixel is acquired according to the original image data, the information of the original pixel is computed according to a preset algorithm to obtain information of target pixel, and an image corresponding to the original image data is controlled to be displayed on an LED display screen panel according to color information of the target pixel and coordination information of the target pixel finally. The problem of poor quality of a displayed image of an LED display screen resulting from generation of Moire patterns is solved, thus improving the quality of a displayed image of an LED display screen.

BRIEF DESCRIPTION OF THE DRAWINGS

The drawings, forming a part of the present application, are intended to provide a further understanding for the disclosure. The schematic embodiments and illustrations of the disclosure are intended to explain the disclosure, and do not form improper limits to the disclosure. In the drawings.

DETAILED DESCRIPTION OF THE EMBODIMENTS

Figure 1:
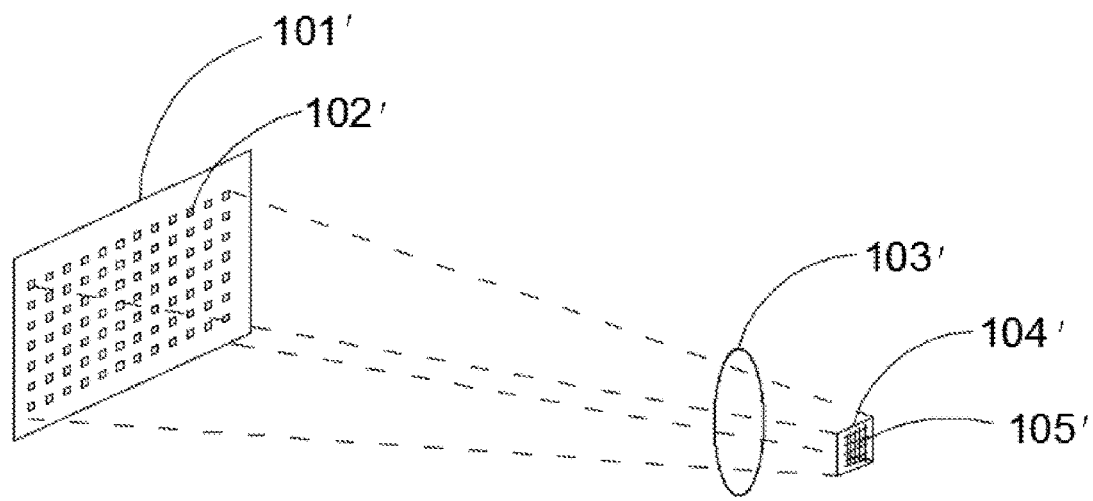
FIG. 1 is a schematic diagram of an image display device for an LED display screen in the related art.
Figure 2:
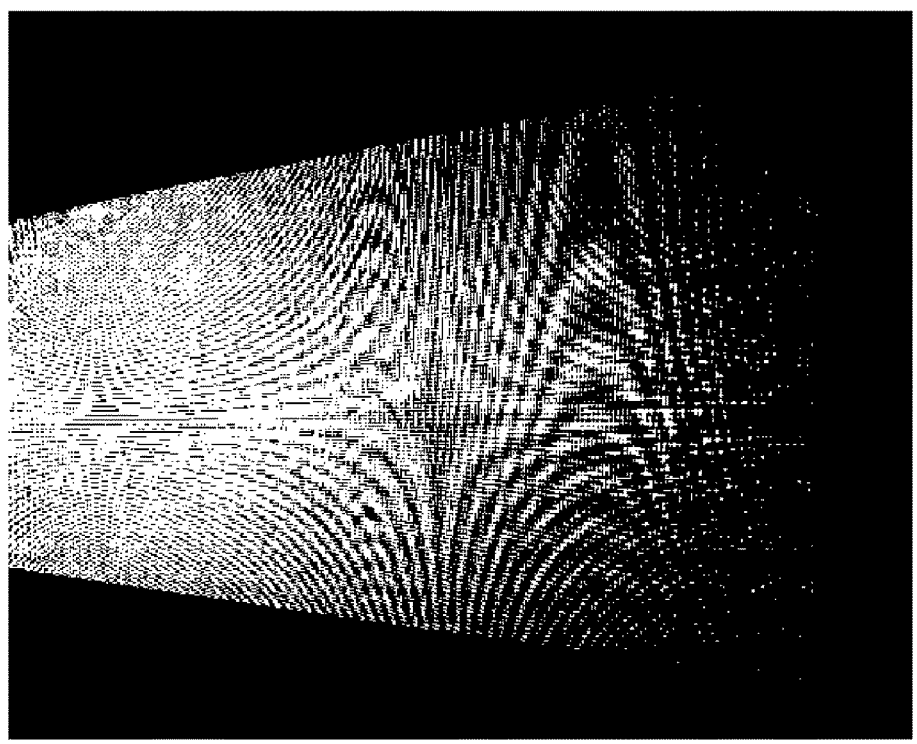
FIG. 2 is a schematic diagram of an LED display screen shot by a digital camera in the related art.

It is important to note that embodiments in the present application and characteristics in the embodiments may be combined under the condition of no conflicts. The disclosure will be illustrated hereinbelow with reference to the drawings and in conjunction with the embodiments in detail.

In order to make those skilled in the art better understand the solutions of the present application, the technical solutions in the embodiments of the present application will be clearly and completely described hereinbelow in conjunction with the drawings in the embodiments of the present application. Obviously, the described embodiments are only a part of the embodiments of the present application, not all of the embodiments. On the basis of the embodiments in the present application, all other embodiments obtained on the premise of no creative work of those skilled in the art should fall within the scope of protection of the present application.

It is important to note that the description and claims of the present application and terms 'first', 'second' and the like in the drawings are used to distinguish similar objects, and do not need to describe a specific sequence or a precedence order. It should be understood that data used in such a way may be exchanged under appropriate conditions, thus facilitating the embodiments of the present application described here. In addition, terms 'include' and 'have' and any inflexions thereof are intended to cover non-exclusive inclusions. For example, it is not limited for processes, methods, systems, products or equipment containing a series of steps or units to clearly list those steps or units, and other steps or units which are not clearly listed or are inherent to these processes, methods, products or equipment may be included instead.

An embodiment of the disclosure provides an image processing device for an LED display.

Figure 4:
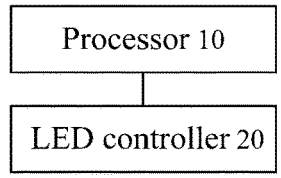
FIG. 4 is a schematic diagram of an image processing device for an LED display according to an embodiment of the disclosure.

FIG. 4 is a schematic diagram of an image processing device for an LED display according to an embodiment of the disclosure. As shown in FIG. 4, the device includes: a processor 10 and an LED controller 20.

The processor 10 is configured to receive original image data, acquire information of an original pixel according to the original image data, and execute computation on the information of the original pixel according to a preset algorithm to obtain information of a target pixel, wherein the original pixel is a pixel point distributed on an LED display screen panel according to a preset rule, the information of the original pixel includes color information of the original pixel and position information of the original pixel, the target pixel is a pixel that is distributed not conforming to the preset rule, and the information of the target pixel includes color information of the target pixel and position information of the target pixel.

Digital photographic equipment shoots image video resource. For example, image video resource is shot by a digital camera, a camera, etc., and the image video resource is displayed on an LED display screen.

After the digital photographic equipment shoots the image video resource, the processor 10 receives original image data of the image video resource. The processor 10 is an image video processor; and the original image data is data of each frame of image of the image video resource, and is used for representing information of the image video resource and determining a final display effect of the image video resource.

The original pixel of the image video resource may be determined by the original image data. The original pixel is a pixel point distributed on an LED display screen panel according to a preset rule. For example, the original pixel is an LED pixel point distributed in a matrix form. The LED pixel point varies along with the variation of LED lamps on the LED display screen panel. After the processor 10 receives the original image data of the image video resource, the processor 10 acquires information of the original pixel according to the original image data. The information of the original pixel includes color information of the original pixel and position information of the original pixel. The color information of the original pixel is represented by series of three-primary colors. For example, color information of a pixel W1H1 is (R, G, B), where R represents a red series in the original pixel, G represents a green series in the original pixel, and B represents a black series in the original pixel. Position information of the original pixel is specific position information of the original pixel on the LED display screen panel, and the specific position information of the original pixel on the LED display screen panel may be determined by a horizontal coordinate and a vertical coordinate of a two-dimensional coordinate system. The original image data includes a plurality of the original pixels constituting each frame of image of the image video resource, and a display effect of an original image on the LED display screen panel is co-determined by the color information and position information of the original pixel.

After the processor 10 acquires the information of the original pixel according to the original image data, the processor 10 executes computation on the information of the original pixel according to a preset algorithm to obtain information of a target pixel. Specifically, the target pixel is a pixel point that is distributed not conforming to the preset rule. Preferably, the target pixel is a pixel point distributed not in a matrix form. That is, the distribution of the target pixel is not characterized by being horizontal and vertical. The information of the target pixel includes color information of the target pixel and position information of the target pixel. The information of the target pixel includes color information of the target pixel and position information of the target pixel. The color information of the target pixels is also represented by series of three-primary colors. For example, color information of a target pixel W1'H1' is (R', G', B'), where R' represents a red series in the target pixel, G' represents a green series in the target pixel, and B' represents a black series in the target pixel. Position information of the target pixel is position information of the target pixel on the LED display screen panel, and specific position information of the target pixel on the LED display screen panel may be determined by a horizontal coordinate and a vertical coordinate of a two-dimensional coordinate system. The processor 10 execute computation on the color information of the original pixel into the color information of the target pixel by means of a preset algorithm, and execute computation on the position information of the original pixel into the position information of the target pixel by means of a preset algorithm. Therefore, the original pixel and the target pixel have a certain correspondence, and an image constituted by a plurality of target pixels and an image constituted by a plurality of original pixels represent the same image.

The LED controller 20 is configured to control, according to the information of the target pixel, the image corresponding to the original image data to be displayed on the LED display screen panel.

After the processor 10 executes computation on the information of the original pixels according to the preset algorithm, according to the color information of the target pixel and the position information of the target pixel, the LED controller 20 controls the image corresponding to the original image data to be displayed on the LED display screen panel. The LED controller may convert information of a plurality of target pixels into signals capable of being received by the LED display screen panel, and may control positions of a plurality of LED lamps on the LED display screen panel, thus making the LED pixel points distributed on the LED display screen panel in a state that do not conform to a preset rule, so as to obtain a plurality of target pixels. The plurality of target pixels are presented in colors corresponding to respective color information, and photosensitive pixel particles in the digital photographic equipment are distributed in a matrix form that conforms to a preset rule, so as not to generate Moire patterns on the image corresponding to the generated original image data due to the phenomenon of Moire patterns. The LED lamps corresponding to the original pixel are re-distributed on the LED display screen panel by means of a preset algorithm, so as to obtain the LED pixel point that do not conform to the preset rule, thus improving the quality of a displayed image of the LED display screen.

In the embodiment of the image processing device for an LED display, the processor 10 receives the original image data, acquires the information of the original pixel according to the original image data, and executes computation on the information of the original pixel according to the preset algorithm to obtain the information of the target pixel, and then the LED controller 20 controls, according to the information of the target pixel, the image corresponding to the original image data to be displayed on the LED display screen panel, thus improving the quality of the displayed image of the LED display screen.

An embodiment of the disclosure provides an image processing method for an LED display. It is important to note that the image processing method for an LED display in the present embodiment may be executed in the image processing device for an LED display according to the embodiment of the disclosure.

Figure 5:
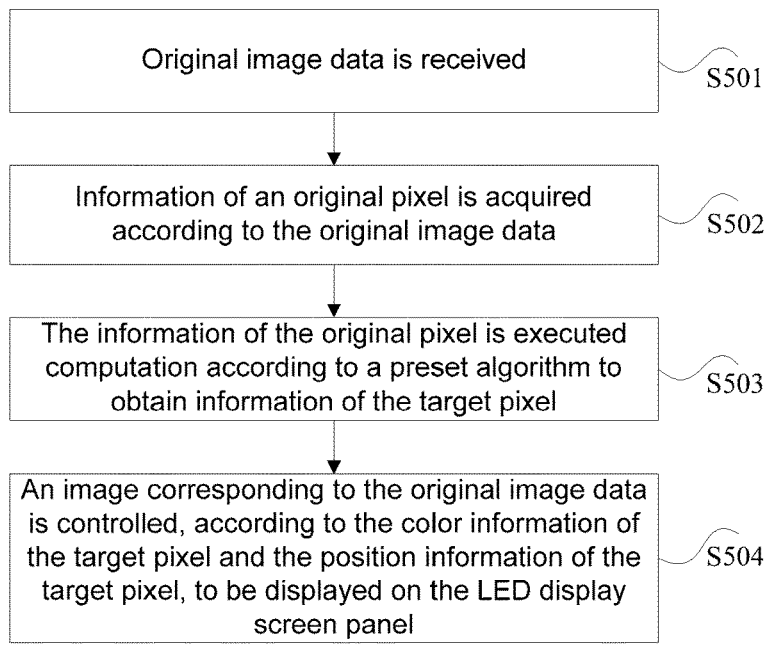
FIG. 5 is a flowchart of an image processing method for an LED display according to a first embodiment of the disclosure.

FIG. 5 is a flowchart of an image processing method for an LED display according to a first embodiment of the disclosure. As shown in FIG. 5, the method includes the following steps.

Step S501: Original image data is received.

The original image data is a data of each frame of image of an image video resource, and is used for representing information of the image video resource such as color information and position information of the image video resource. Image effects such as the color, contour, position, luminance and definition of an image of the image video resource are determined by means of the original image data. The original image data may be acquired by digital photographic equipment. For example, the original image data may be acquired by means of digital photographic equipment, a camera and a photographic device of a mobile phone. The digital photographic equipment includes an optical lens, a photosensitive device for photoelectric conversion, photosensitive pixels particles on the photosensitive device, etc. The photosensitive pixels particles are distributed in a matrix form and characterized by being horizontal and vertical. After the original image data is acquired by the digital photographic equipment, the original image data may be received by an image video processor.

Step S502: Information of an original pixel is acquired according to the original image data.

Figure 6:
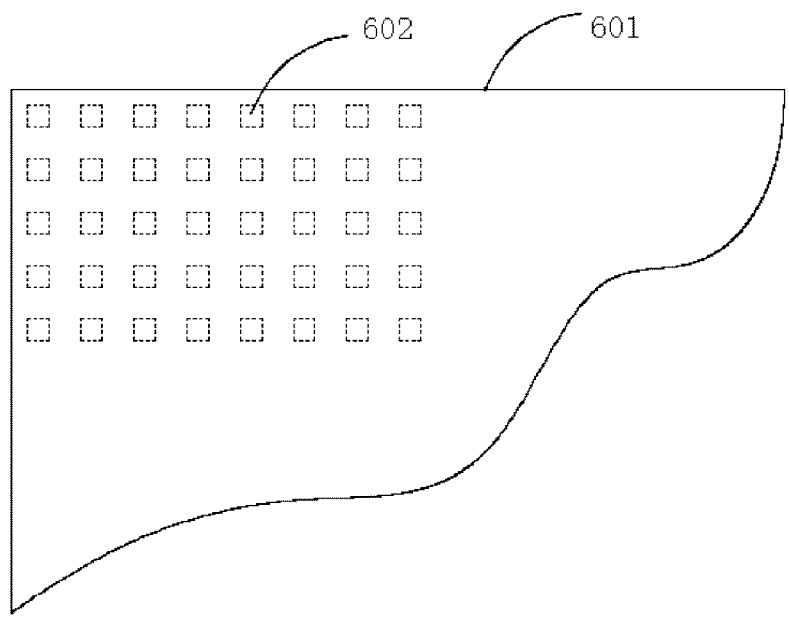
FIG. 6 is a schematic diagram of original pixels distributed in a matrix form according to an embodiment of the disclosure.

After the original image data is received, the information of the original pixel is acquired according to the original image data. The original pixel is a pixel point distributed on an LED display screen panel according to a preset rule, and the information of the original pixel includes color information of the original pixel and position information of the original pixel. Specifically, the original pixel of the image video resource may be determined by the original image data. That is, information of an LED pixel point on the LED display screen panel is determined. The distribution of the LED pixel point varies along with the variation of a LED lamp on the LED display screen panel. For example, the LED lamp on the LED display screen panel is distributed in a matrix form, so the distribution manner for the LED pixel point on the LED display screen panel and the distribution manner for the LED lamp is the same as a matrix distribution manner, as shown in FIG. 6. FIG. 6 is a schematic diagram of original pixels distributed in a matrix form according to an embodiment of the disclosure, wherein 601 is an LED display screen panel, and 602 is the original pixel. The original pixel 602 is distributed on the LED display screen panel 601 in a matrix form and characterized by being horizontal and vertical. The distribution manner of the original pixel on the LED display screen panel is the same as the distribution manner for the photosensitive pixels particles on the photosensitive device of the digital photographic equipment. The original image data includes a plurality of the original pixels 602 constituting each frame of image of the image video resource, and a display effect of an original image on the LED display screen panel is co-determined by the color information and position information of the original pixel 602.

Figure 7:
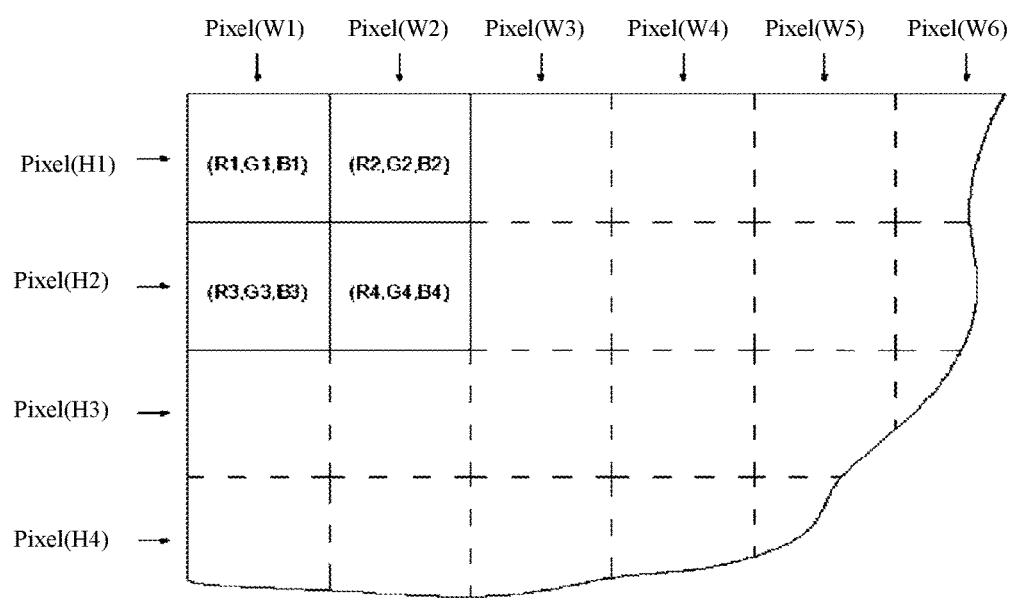
FIG. 7 is a schematic diagram of color information of original pixels according to an embodiment of the disclosure.

After the information of the original pixel is acquired according to the original image data, the color information of the original pixel is extracted. The color information of the original pixel is represented by (R, G, B), where R represents red series in the original pixels, G represents green series in the original pixels, and B represents black series in the original pixels. The position information of the original pixel is represented by a two-dimensional coordinate system. FIG. 7 is a schematic diagram of color information of original pixels according to an embodiment of the disclosure. As shown in FIG. 7, the position information of the original pixel is determined by horizontal coordinate pixel (W) and vertical coordinate pixel (H) of the original pixel in the two-dimensional coordinate system, wherein each lattice represents an original pixel such as an original pixel W1H1 (R1, G1, B1), an original pixel W2H2 (R2, G2, B2), an original pixel W3H3 (R3, G3, B3), and an original pixel W4H4 (R4, G4, B4).

After the information of the original pixel is acquired according to the original image data, pixel pitch information of the original pixels is extracted. Preferably, the pixel pitch information of the original pixels is extracted from the position information of the original pixel, wherein the pixel pitch information is used for representing information of a pitch between adjacent original pixels.

Figure 8:
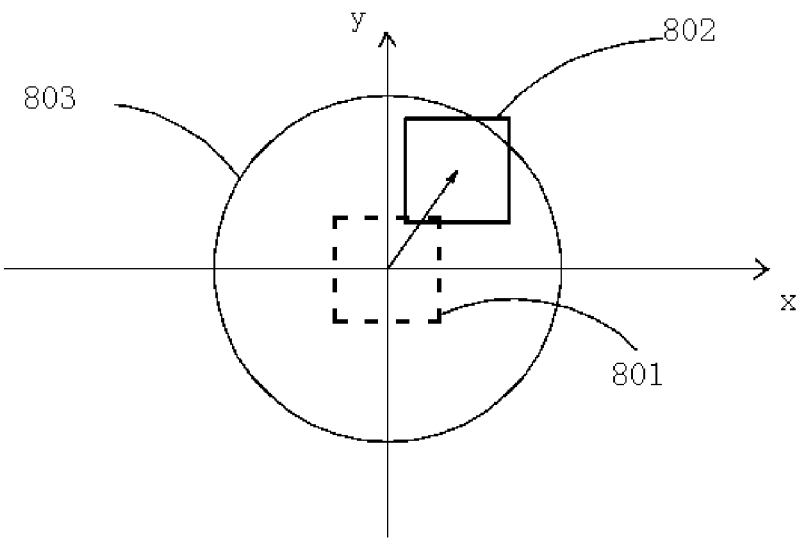
FIG. 8 is a schematic diagram of an offset of the original pixel according to an embodiment of the disclosure.

After the information of the original pixel is acquired according to the original image data, respectively determining an offset needed for moving the original pixel to the target pixel includes: determining a magnitude and a direction of an offset needed for moving the original pixel to the target pixel. Preferably, the offset includes a horizontal coordinate offset and a vertical coordinate offset. The horizontal coordinate offset and the vertical coordinate offset are less than or equal to a preset threshold, the preset threshold is less than a pixel pitch of the original pixels. FIG. 8 is a schematic diagram of an offset of the original pixel according to an embodiment of the disclosure. As shown in FIG. 8, a two-dimensional coordinate system of which an original pixel serves as an origin is established, where 801 is a position of the original pixel, that is, the origin of the two-dimensional coordinate system, 802 is a position of a target pixel, 803 is a circular area of which a preset threshold R serves as a radius, that is, a range of an offset allowing the original pixel to offset, and the preset threshold R is less than a pitch of original pixels. The original pixel includes multiple original pixels, the offset needed for moving the original pixel to the target pixel is determined comprises: the offsets needed for moving the multiple original pixels to target pixels corresponding to the multiple original pixels is respectively determined to obtain multiple offsets, wherein the multiple offsets are different in magnitude or direction, and the multiple offsets determines a degree of dispersion of the target pixel.

After the information of the original pixel is acquired according to the original image data, coordinate information of the original pixels is extracted. Preferably, the coordinate information of the original pixel is two-dimensional coordinate information of the original pixel, i.e., horizontal coordinate information of the original pixel and vertical coordinate information of the original pixel.

Step S503: The information of the original pixel is executed computation according to a preset algorithm to obtain information of the target pixel.

After the information of the original pixel is acquired according to the original image data, the information of the original pixel is executed computation according to the preset algorithm to obtain the information of the target pixel. The original pixel and the target pixel have a certain correspondence, so an image constituted by a plurality of target pixels and an image constituted by a plurality of original pixels represent the same image. Preferably, the color information of the original pixel and the position information of the original pixel are computed according to the preset algorithm to obtain the information of the target pixel. The information of the target pixel includes color information of the target pixel and position information of the target pixel.

Figure 9:
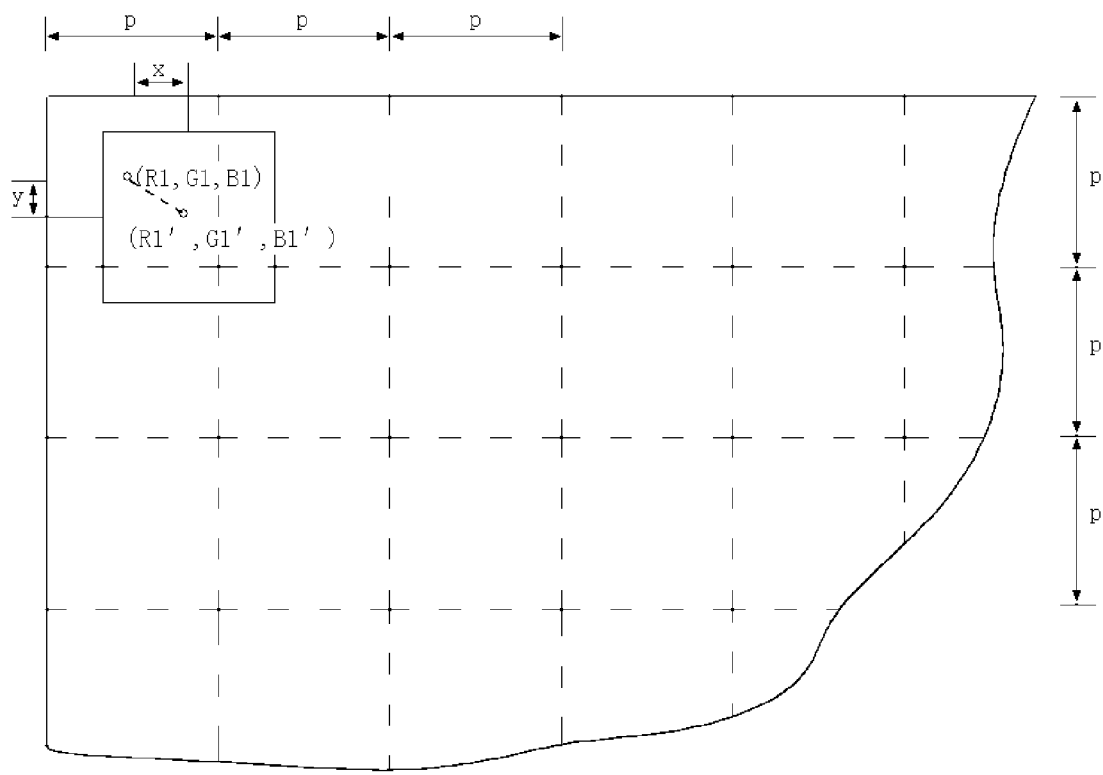
FIG. 9 is a schematic diagram of the original pixel and the target pixel according to a first embodiment of the disclosure.

After the color information of the original pixel is extracted, the pixel pitch information of the original pixel is extracted and the offset needed for moving the original pixel to the target pixel is determined, the information of the original pixel is executed computation according to the preset algorithm comprises: the color information of the original pixel, the pixel pitch information of the original pixel and the offset is executed computation according to the preset algorithm to obtain the color information of the target pixel. FIG. 9 is a schematic diagram of original pixel and target pixel according to a first embodiment of the disclosure. As shown in FIG. 9, the original pixel is distributed in a matrix form, each lattice in the matrix form representing an original pixel. The pixel pitch information of the original pixel is a pixel pitch p, a horizontal coordinate of an original pixel of which the color information is (R1, G1, R1) is offset by x, and a vertical coordinate of the original pixel is offset by y, so as to obtain a target pixel at a location as shown in FIG. 9, the color information thereof being (R1', G1', R1'). Alternatively, a specific algorithm for the color information (R1', G1', R1') of the target pixel is as follows.

Suppose $K1=x*(p-y)/(p*p)$, $K2=x*y/(p*p)$, $K3=y*(p-x)/(p*p)$, $R1'=R1*(1-K1-K2-K3)+R2*K1+R4*K2+R3*K3$ $G1'=G1*(1-K1-K2-K3)+G2*K1+G4*K2+G3*K3$ $B1'=B1*(1-K1-K2-K3)+132*K1+134*K2+133*K3$ The algorithm converts the color information (R1, G1, R1) of the original pixel into the color information (R1', G1', R1') of the target pixel by means of the pixel pitch information of the original pixel and the offset, so the color information of an original pixel on an LED display screen can be adjusted along with the location variation of the original pixel, thus improving the quality of image display.

Figure 10:
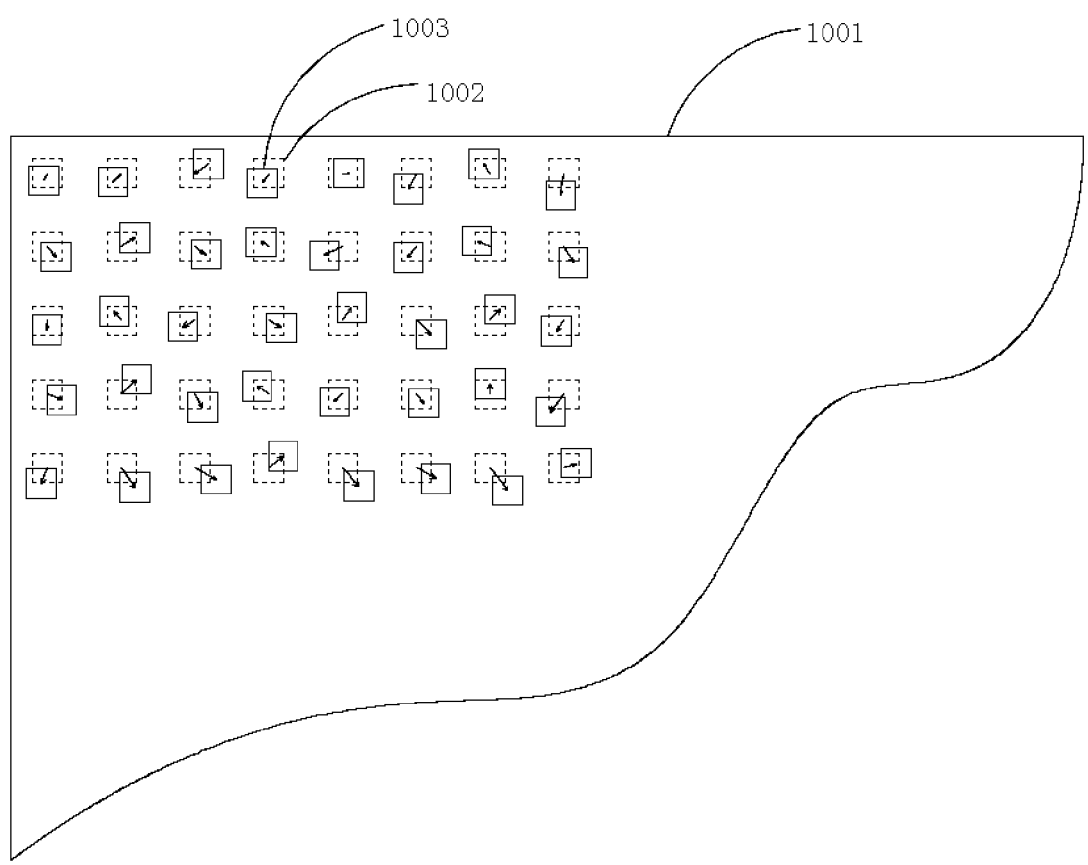
FIG. 10 is a schematic diagram of the original pixel and the target pixel according to a second embodiment of the disclosure.
Figure 11:
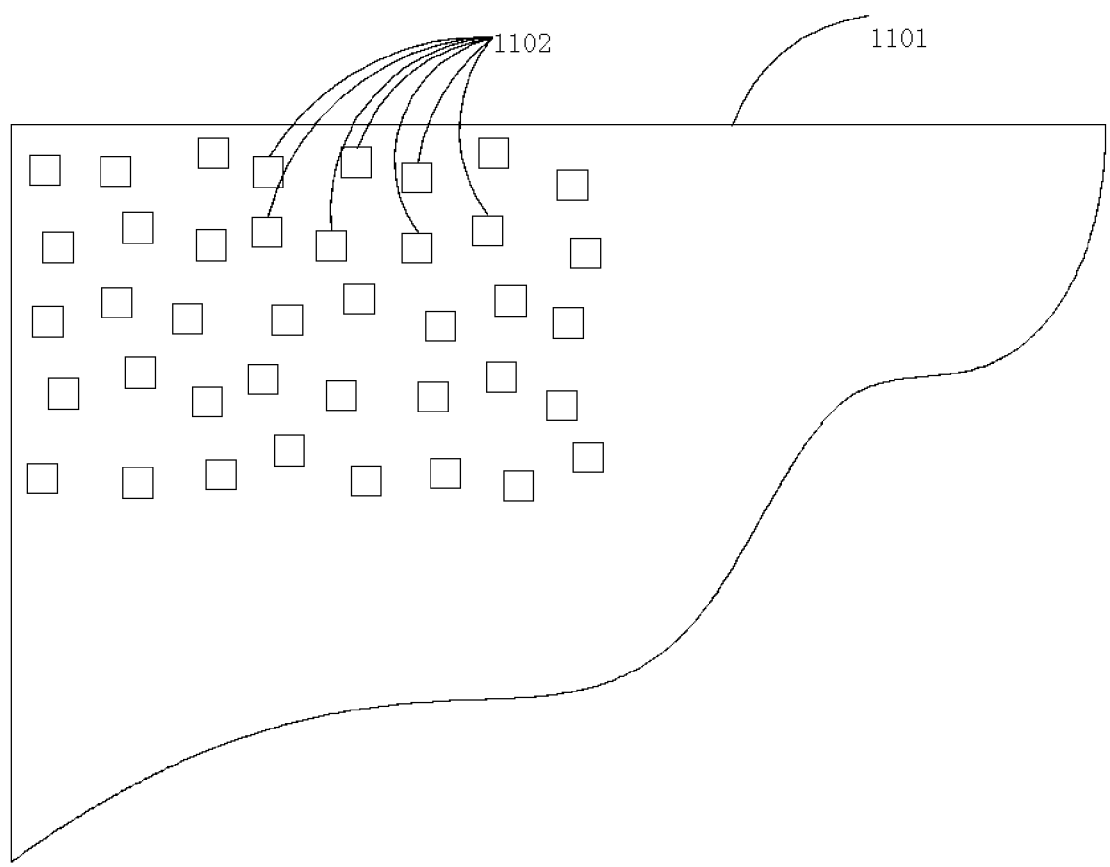
FIG. 11 is a schematic diagram of target pixels according to a first embodiment of the disclosure.
Figure 12:
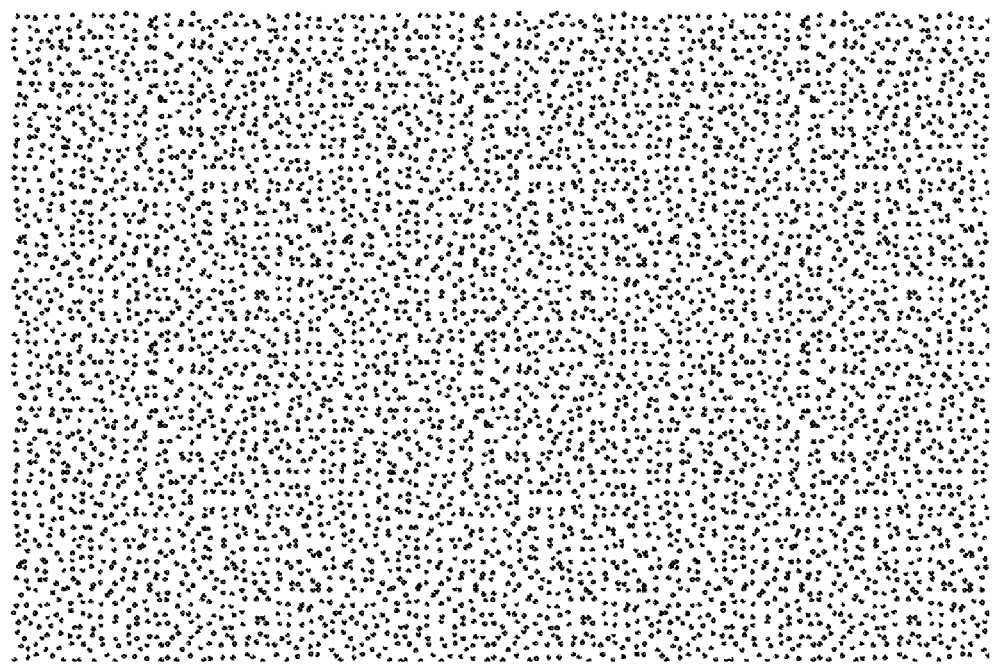
FIG. 12 is a schematic diagram of target pixels according to a second embodiment of the disclosure.

After the coordinate information of the original pixel is extracted, the information of the original pixel is executed computation according to a preset algorithm further includes: the coordinate information of the original pixel is offset according to the offset, that is, the horizontal coordinate information and vertical coordinate information of the original pixel is offset according to the magnitude and direction of the offset, as shown in FIG. 10. FIG. 10 is a schematic diagram of the original pixel and the target pixel according to a second embodiment of the disclosure. 1001 is an LED display screen panel, 1002 is original pixel, and 1003 is target pixel; the multiple original pixels 1002 are offset in different directions and magnitudes; and when the difference between the directions and magnitudes of offset of the original pixels 1002 is larger, the degree of irregular distribution of the target pixel 1003 will be larger, so the target pixels 1003 on the LED display screen panel 1001 change the horizontal and vertical distribution manner for the original pixels 1002. FIG. 11 is a schematic diagram of the target pixel according to a first embodiment of the disclosure. As shown in FIG. 11, 1101 is an LED display screen panel, and 1102 is target pixel; and after the original pixel is offset, the target pixel 1102 is a discrete LED pixel point not distributed in a preset rule. FIG. 12 is a schematic diagram of the target pixel according to a second embodiment of the disclosure. As shown in FIG. 12, the target pixels are a great number of irregular discrete LED pixel points presented on an LED display screen panel obtained through a preset algorithm, thus avoiding the phenomenon of Moire patterns during image display, and improving the quality of image display.

In the present embodiment, the original pixel is executed computation through the preset algorithm so as to obtain the color information of the target pixel and obtain the position information of the target pixel by offsetting through the preset algorithm, thus obtaining the information of the target pixel.

Step S504: An image corresponding to the original image data is controlled, according to the color information of the target pixel and the position information of the target pixel, to be displayed on the LED display screen panel.

After the information of the original pixel is computed according to the preset algorithm, the image corresponding to the original image data is controlled to be displayed on the LED display screen panel according to the color information of the target pixel and the position information of the target pixel. Specifically, a position of an LED pixel point on the LED display screen panel is controlled according to the position information of the target pixel, and the image is displayed on the LED display screen panel according to the position of the LED pixel point and the color information of the target pixel. The target pixel and the original pixel have a certain correspondence through the preset algorithm, and an image constituted by a plurality of target pixels and an image constituted by a plurality of original pixels represent a same image.

In the embodiment of the image processing method for an LED display, the original image data is received, the information of the original pixel is acquired according to the original image data, the information of the original pixel is executed computation according to the preset algorithm to obtain the information of the target pixel, and the image corresponding to the original image data is controlled to be displayed on the LED display screen panel according to the color information of the target pixel and the position information of the target pixel finally, thus improving the quality of the displayed image of the LED display screen.

Figure 13:
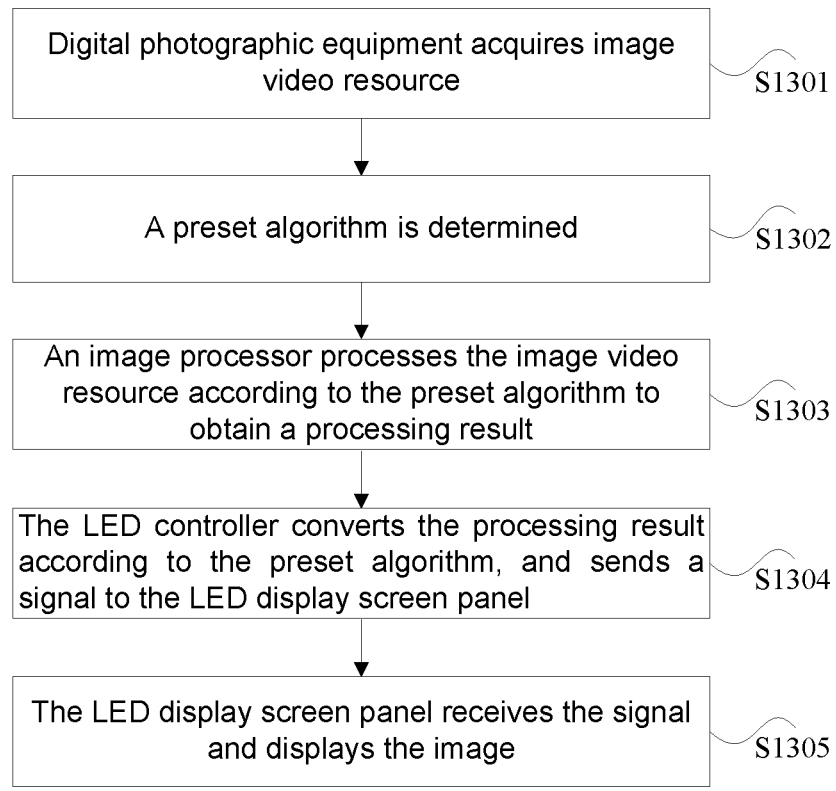
FIG. 13 is a flowchart of an image processing method for an LED display according to a second embodiment of the disclosure.

FIG. 13 is a flowchart of an image processing method for an LED display according to a second embodiment of the disclosure. As shown in FIG. 13, the method includes the following steps.

Step S1301: Digital photographic equipment acquires image video resource.

Original image data may be acquired by the digital photographic equipment. For example, the original image data is acquired by a digital camera, a camera, a photographic device of a mobile phone, etc. Information of the original pixel is acquired according to the original image data.

Step S1302: A preset algorithm is determined.

The preset algorithm may execute computation on the color information of the original pixel and the position information of the original pixel to obtain the target pixel, such that the target pixel is a discrete LED pixel point which is distributed not in a preset rule, and meanwhile, the color information of the target pixels is adjusted. The original pixel is a pixel distributed on an LED display screen panel according to a preset rule, the information of the original pixel includes the color information of the original pixel and the position information of the original pixel, the target pixel is a pixel that is distributed not conforming to the preset rule, and the information of the target pixels includes color information of the target pixel and position information of the target pixel. The preset algorithm is embedded into an image processing system and an LED controller through software, and may be updated according to the update of the algorithm.

Step S1303: An image processor processes the image video resource according to the preset algorithm to obtain a processing result.

The image processor receives the original image data from the digital photographic equipment. For example, the image processor receives the original image data from the digital camera, the camera, the photographic device of the mobile phone, etc. The image processor acquires the information of the original pixels according to the original image data, and executes computation the information of the original pixel according to the preset algorithm to obtain a processing result including the information of the target pixel.

Step S1304: The LED controller converts the processing result according to the preset algorithm, and sends a signal to the LED display screen panel.

The LED controller converts the processing result according to the preset algorithm and the processing result processed through the image processor, such that the processing result becomes a signal capable of being received by the LED display screen panel. The signal may be a control signal for controlling the LED display screen panel to display, or may be a data signal of an image, etc.

Step S1305: The LED display screen panel receives the signal and displays the image.

The LED display screen panel receives the signal and displays the image corresponding to the image video resource. The target pixel and the original pixel have a certain correspondence through the preset algorithm, and an image constituted by multiple target pixels and an image constituted by multiple original pixels are the one image.

Figure 3:
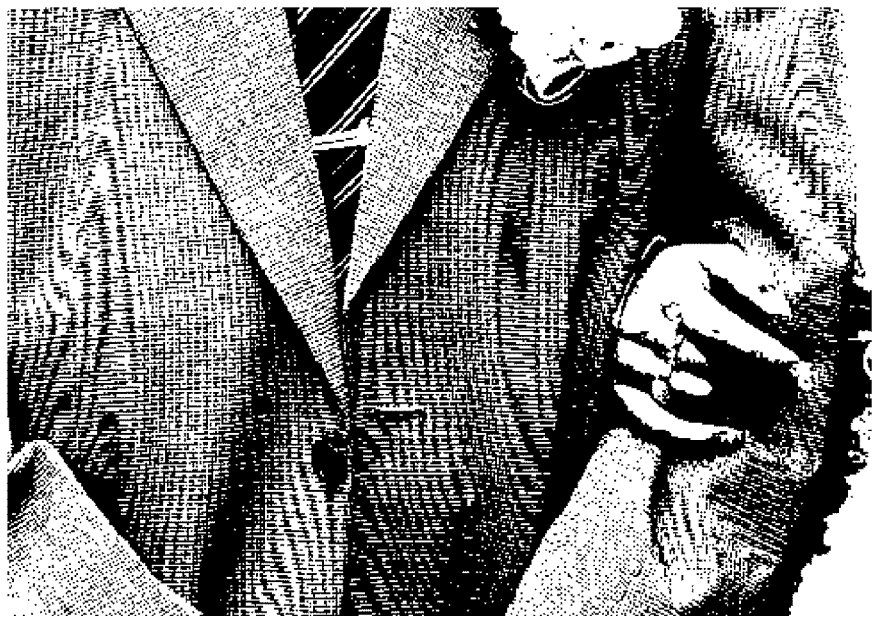
FIG. 3 is a schematic diagram of a displayed image of an LED display screen in the related art.
Figure 14:
FIG. 14 is a schematic diagram of an image determined by target pixels according to an embodiment of the disclosure.

FIG. 14 is a schematic diagram of an image determined by target pixel according to an embodiment of the disclosure. As shown in FIG. 14, an image of a lion is obtained through digital photographic equipment, processed through an image processor having a preset algorithm and an LED controller, and the image of the lion is output to an LED display screen, and further displayed on the LED display screen. The image of the lion displayed on the LED display screen is composed of a great number of pixel points which do not conform to a matrix type distribution rule. The image is true and clear, and the textures in the regular array as shown in FIG. 3 do not appear, so that the quality of the image is high, and the visual effect is good.

In the embodiment of the image processing method for an LED display, the digital photographic equipment acquires the image video resources, and the preset algorithm is determined. The image processor processes the image video resources according to the preset algorithm to obtain the processing results. The LED controller converts the processing result according to the preset algorithm and sends the signal to the LED display screen panel, and the LED display screen panel receives the signal and displays the image, thus improving the quality of the displayed image of the LED display screen.

It is important to note that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

The embodiment of the disclosure further provides an image processing device for an LED display. It is important to note that the image processing device for the LED display may be configured to execute the image processing method for an LED display according to the embodiment of the disclosure.

Figure 15:
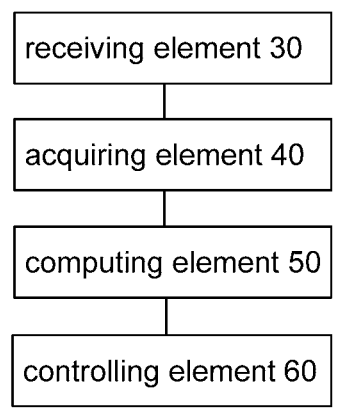
FIG. 15 is a schematic diagram of an image processing device for an LED display according to an embodiment of the disclosure.

FIG. 15 is a schematic diagram of an image processing device for an LED display according to an embodiment of the disclosure. As shown in FIG. 15, the image processing device for the LED display includes: a receiving element 30, an acquiring element 40, a computing element 50 and a controlling element 60.

The receiving element 30 is configured to receive original image data.

The acquiring element 40 is configured to acquire information of an original pixel according to the original image data, wherein the original pixel is a pixel point distributed on an LED display screen panel according to a preset rule, and the information of the original pixel includes color information of the original pixel and position information of the original pixel.

The computing element 50 is configured to execute computation on the information of the original pixel according to a preset algorithm to obtain information of a target pixel, wherein the target pixel is a pixel that is distributed not conforming to the preset rule, and the information of the target pixel includes color information of the target pixels and position information of the target pixel.

The controlling element 60 is configured to control, according to the color information of the target pixel and the position information of the target pixel, an image corresponding to the original image data to be displayed on the LED display screen panel.

The image processing device for an LED display further includes an extracting element and a determining element, wherein the extracting element is configured to extract, after the acquiring element 40 acquires the information of the original pixel according to the original image data, the color information of the original pixel, and extract pixel pitch information of the original pixel, wherein the pixel pitch information is information for representing a pitch between adjacent original pixels; and the determining element is configured to determine an offset needed for moving the original pixel to the target pixel. The computing element 50 executes, according to a preset algorithm, computation on the color information of the original pixel, the pixel pitch information of the original pixel, and the offset, to obtain color information of a target pixel. The original pixel includes multiple original pixels, and the determining element respectively determines offsets needed for moving multiple original pixels to the target pixels corresponding to the multiple original pixels so as to obtain multiple offsets, wherein the offsets are different in magnitude or direction.

After the information of the original pixel is acquired according to the original image data, the extracting element extracts coordinate information of the original pixel. The computing element 50 is further configured to offset the coordinate information of the original pixel according to the offset to obtain coordinate information of the target pixel, and the controlling element 60 is further configured to control a position of an LED pixel point on the LED display screen panel according to the coordinate information of the target pixel, and display an image on the LED display screen panel according to the position of the LED pixel point and the color information of the target pixel.

In the present embodiment, the original image data is data of each frame of image of the image video resource, and is used for representing information of the image video resource. The original image data may be acquired by digital photographic equipment. After the digital photographic equipment acquires the original image data, the receiving element 30 receives the original image data. After the receiving element 30 receives the original image data, the acquiring element 40 acquires the information of the original pixel according to the original image data. The information of the original pixel includes the color information of the original pixel and the position information of the original pixel. Specifically, the original pixel of the image video resource may be determined by the original image data. That is, the information of the LED pixel point on the LED display screen panel is determined. After the acquiring element 40 acquires the information of the original pixel according to the original image data, the extracting element extracts the color information of the original pixel. The extracting element extracts the pixel pitch information of the original pixel after the information of the original pixel is acquired according to the original image data. Preferably, the pixel pitch information of the original pixel is extracted from the position information of the original pixel, wherein the pixel pitch information is used for representing information of a pitch between adjacent original pixels. After the extracting element acquires the information of the original pixel according to the original image data, the determining element determines an offset needed for moving the original pixel to the target pixel. Preferably, the offset include a horizontal coordinate offset and a vertical coordinate offset. The horizontal coordinate offset and the vertical coordinate offset are less than or equal to a preset threshold, and the preset threshold is less than the pixel pitch of the original pixels. The determining element respectively determines offsets needed for moving multiple original pixels to target pixels corresponding to the multiple original pixels to obtain multiple offsets, wherein the offsets are different in magnitude or direction, and the multiple offsets decides the degree of dispersion of the target pixels.

In the present embodiment, the extracting element extracts the coordinate information of the original pixel. Preferably, the coordinate information of the original pixel is two-dimensional coordinate information of the original pixel. That is, the extracting element extracts horizontal coordinate information of the original pixel and vertical coordinate information of the original pixel.

In the present embodiment, the computing element 50 executes computation on the original pixel through the preset algorithm to obtain the color information of the target pixels, and obtains the position information of the target pixel by offsetting through the preset algorithm, thus obtaining the information of the target pixel. The target pixel and the original pixel have a certain correspondence through the preset algorithm, and an image constituted by a plurality of target pixels and an image constituted by a plurality of original pixels represent the same image. Specifically, after the extracting element extracts the color information of the original pixel and the pixel pitch information of the original pixel and the determining element determines an offset needed for moving the original pixel to the target pixel, the computing element 50 computes the color information of the original pixel, the pixel pitch information of the original pixel and the offset through the preset algorithm to obtain the color information of the target pixel. The computing element

50 offsets the coordinate information of the original pixel according to the offset, that is, offsets the horizontal coordinate information and vertical coordinate information of the original pixel according to the magnitude and direction of the offset.

In the present embodiment, after the computing element 50 computes the information of the original pixel according to the preset algorithm, the controlling element 60 controls the position of the LED pixel point on the LED display screen panel according to the coordinate information of the target pixel, and displays an image on the LED display screen panel according to the position of the LED pixel point and the color information of the target pixel. The target pixel and the original pixel have a certain correspondence through the preset algorithm, and an image constituted by a plurality of target pixels and an image constituted by a plurality of original pixels represent a same image.

In the embodiment of the image processing device for the LED display, the receiving element 30 receives the original image data, the acquiring element 40 acquires the information of the original pixel according to the original image data. The computing element 50 executes the computation the information of the original pixel according to the preset algorithm to obtain the information of the target pixel. The controlling element 60 controls the image corresponding to the original image data to be displayed on the LED display screen panel according to the color information of the target pixel and the position information of the target pixel, thus improving the quality of the displayed image of the LED display screen.

The embodiment of the disclosure is an image processing technology for an LED display screen, capable of resisting against Moire patterns. The image processing technology may includes a preset algorithm, the LED lamp is distributed on the LED display screen panel according to a distribution manner that does not conform to a matrix distribution manner, and the corresponding preset algorithm is applied to a specific image processing system and LED controller, so the effect of avoiding the phenomenon of Moire patterns is achieved whilst the LED display screen cannot slightly deform, thus improving the quality of the displayed image of the LED display screen.

Obviously, those skilled in the art shall understand that all of the above-mentioned modules or steps in the disclosure may be implemented by using a general computing device, may be centralized on a single computing device or may be distributed on a network composed of a plurality of computing devices. Alternatively, they may be implemented by using executable program codes of the computing devices. Thus, they may be stored in a storage device and executed by the computing devices, or they are manufactured into each integrated circuit module respectively, or multiple modules or steps therein are manufactured into a single integrated circuit module. Thus, the disclosure is not limited to a combination of any specific hardware and software.

The above is only the preferred embodiments of the disclosure, and not intended to limit the disclosure. There may be various modifications and variations in the disclosure for those skilled in the art. Any modifications, equivalent replacements, improvements and the like made within the spirit and principle of the disclosure shall fall within the scope of protection of the disclosure.

What is claimed is:

1. An image processing method for a Light Emitting Diode (LED) display screen comprising:
   receiving original image data;
   acquiring information of an original pixel according to the original image data, wherein the original pixel is a pixel point distributed on an LED display screen panel according to a preset rule, and the information of the original pixel comprises color information of the original pixel and position information of the original pixel;
   executing a computation on the information of the original pixel according to a preset algorithm to obtain information of a target pixel, wherein the target pixel is a pixel that is distributed not conforming to the preset rule, and the information of the target pixel comprises color information of the target pixel and position information of the target pixel; and
   controlling, according to the color information of the target pixel and the position information of the target pixel, an image corresponding to the original image data to be displayed on the LED display screen panel.

2. The method as claimed in claim 1, wherein
after acquiring the information of the original pixel according to the original image data, the method further comprises:
   extracting the color information of the original pixel;
   extracting pixel pitch information of the original pixel, wherein the pixel pitch information is information for representing a pitch between adjacent original pixels; and
   determining an offset needed for moving the original pixel to the target pixel,
wherein executing the computation on the information of the original pixel according to the preset algorithm comprises:
   executing the computation on the color information of the original pixel, the pixel pitch information of the original pixel, and the offset by means of the preset algorithm to obtain color information of the target pixel.

3. The method as claimed in claim 2, wherein
after acquiring the information of the original pixel according to the original image data, the method further comprises:
   extracting coordination information of the original pixel;
executing the computation on the information of the original pixel according to the preset algorithm comprises:
   offsetting the coordination information of the original pixel according to the offset to obtain coordination information of the target pixel; and
controlling, according to the color information of the target pixel and the position information of the target pixel, the image corresponding to the original image data to be displayed on the LED display screen panel comprises:
   controlling a position of an LED pixel point on the LED display screen panel according to the coordination information of the target pixel, and displaying the image on the LED display screen panel according to the position of the LED pixel point and the color information of the target pixel.

4. The method as claimed in claim 2, wherein the offset comprises a horizontal coordinate offset and a vertical coordinate offset, wherein the horizontal coordinate offset and the vertical coordinate offset are less than or equal to a preset threshold, and the preset threshold is less than a pixel pitch of the original pixel.

5. The method as claimed in claim 2, wherein a number of the original pixel is multiple, and determining the offset needed for moving the original pixel to the target pixel comprises:

respectively determining the offset needed for moving the multiple original pixels to target pixels corresponding to the multiple original pixels to obtain multiple offsets, wherein the multiple offsets are different in magnitude or direction.

6. An image processing device for a Light Emitting Diode (LED) display screen comprising:

a receiving element configured to receive original image data;

an acquiring element configured to acquire information of an original pixel according to the original image data, wherein the original pixel is a pixel point distributed on an LED display screen panel according to a preset rule, and the information of the original pixel comprises color information of the original pixel and position information of the original pixel;

a computing element configured to execute a computation on the information of the original pixel according to a preset algorithm to obtain information of a target pixel, wherein the target pixel is a pixel that is distributed not conforming to the preset rule, and the information of the target pixel comprises color information of the target pixel and position information of the target pixel; and a controlling element configured to control, according to the color information of the target pixel and the position information of the target pixel, an image corresponding to the original image data to be displayed on the LED display screen panel.

7. The device as claimed in claim 6, further comprising:
an extracting element configured to extract, after the information of the original pixel is acquired according to the original image data, the color information of the original pixel, and extract pixel pitch information of the original pixel, wherein the pixel pitch information is information for representing a pitch between adjacent original pixels; and a determining element, configured to determine an offset needed for moving the original pixel to the target pixel, wherein the computing element is configured to execute the computation on the color information of the original pixel, the pixel pitch information of the original pixel and the offset by means of the preset algorithm to obtain color information of the target pixel.

8. The device as claimed in claim 7, wherein
the extracting element is further configured to extract, after the information of the original pixel is acquired according to the original image data, coordinate information of the original pixel, the computing element is further configured to offset the coordinate information of the original pixel according to the offset to obtain coordinate information of the target pixel, and the controlling element is configured to control a position of an LED pixel point on the LED display screen panel according to the coordination information of the target pixel, and to display the image on the LED display screen panel according to the position of the LED pixel point and the color information of the target pixel.

9. The device as claimed in claim 7, wherein a number of the original pixel is multiple, and the determining element is further configured to respectively determine offsets needed for moving the multiple original pixels to target pixels corresponding to the multiple original pixels to obtain multiple offsets, wherein the multiple offsets are different in magnitude or direction.

10. A Light Emitting Diode (LED) display comprising the image processing device for the LED display screen according to claim 6.

11. The LED display as claimed in claim 10, comprising the image processing device for the LED display screen according to claim 7.

12. The LED display as claimed in claim 10, comprising the image processing device for the LED display screen according to claim 8.

13. The LED display as claimed in claim 10, comprising the image processing device for the LED display screen according to claim 9.

14. An image processing device for a Light Emitting Diode (LED) display screen comprising:

a processor configured to:
receive original image data,
acquire information of an original pixel according to the original image data, and
execute computation on the information of the original pixel according to a preset algorithm to obtain information of a target pixel, wherein the original pixel is a pixel point distributed on an LED display screen panel according to a preset rule, the information of the original pixel comprises color information of the original pixel and position information of the original pixel, the target pixel is a pixel that is distributed not conforming to the preset rule, and the information of the target pixel comprises color information of the target pixel and position information of the target pixel; and an LED controller configured to control, according to the information of the target pixel, an image corresponding to the original image data to be displayed on the LED display screen panel.

15. A Light Emitting Diode (LED) display, comprising the image processing device for the LED display screen according to claim 14.

* * * * *